United States Patent [19]
Richeson et al.

[11] Patent Number: 5,431,972
[45] Date of Patent: Jul. 11, 1995

[54] NUCLEATION OF CRYSTALLIZATION IN POLYESTERS

[75] Inventors: Donald E. Richeson, North Canton; William G. Perkins; Walter F. Johnston, both of Akron, all of Ohio

[73] Assignee: Shell Oil Company, Houston, Tex.

[21] Appl. No.: 142,260

[22] Filed: Oct. 22, 1993

[51] Int. Cl.$^6$ .............................................. C08L 67/02
[52] U.S. Cl. ........................ 428/36.92; 428/35.7; 524/342; 525/165; 525/166
[58] Field of Search ............... 525/165, 166; 524/342; 428/35.7, 36.92

[56] References Cited

U.S. PATENT DOCUMENTS

| | | |
|---|---|---|
| 3,723,373 | 3/1973 | Lucas ................................. 525/165 |
| 3,960,807 | 6/1976 | McTaggart . |
| 4,572,852 | 2/1986 | Gartland et al. . |
| 4,914,145 | 4/1990 | Tohdoh ............................. 524/285 |
| 4,996,269 | 2/1993 | Richeson et al. . |
| 5,023,137 | 6/1991 | Smith et al. . |

*Primary Examiner*—Patricia A. Short
*Attorney, Agent, or Firm*—Douglas Baldwin; Denise Y. Wolfs

[57] ABSTRACT

This invention is a composition and a kit to prepare the composition and articles made from the composition, which composition comprises polyethylene terephthalate, a nucleating agent having a defined Nucleation Index and optionally a polyolefin and a heat stabilizer. A particularly effective nucleating agent is polytetrafluoroethylene.

12 Claims, No Drawings

NUCLEATION OF CRYSTALLIZATION IN POLYESTERS

BACKGROUND

This invention relates to polyester compositions having nucleating agents to promote crystallization and to articles made by thermoforming the nucleated crystalline polyesters.

Polyesters are widely used for articles for which non-toxicity, good heat stability, resistance to deformation and ease of manufacture are important. Polyethylene terephthalate ("PET") has, for example, become the material of choice for dual ovenable (ability to be used in conventional ovens as well as microwave ovens) food packages and trays. Food trays and similar articles are generally made from polyester by thermoforming. In thermoforming, polyester sheet is preheated to its deformation temperature and made to conform to the contours of a mold by vacuum assist (vacuuming it into the mold), air pressure assist (blowing it into the mold), and matched mold assist (forcing it into the mold). In another process extruded melted sheet is cooled to the proper forming temperature before molding by the means described above. It is essential that the polyester, after forming, be partially crystalline to maintain good dimensional stability, stiffness and other desirable properties. Crystallinity of about 15 to 32 percent after forming is normally adequate. It is a happy coincidence that polyesters crystallize upon heating, so that the thermoforming step plus a period of heat treatment (holding the article at the molding temperature for a time) results in the desired crystallinity. Of course, the polyester must be properly selected, and have added to it a suitable crystallization nucleation agent, i.e. an agent (usually particles) which initiate and provide a starting point on which crystallites can form. It is also necessary to provide some improvement in impact strength (to prevent or at least reduce shattering). This can be done by adding a small amount of a polyolefin.

Thermoforming of thin walled articles from unmodified polyester films and sheeting with heat treatment in a heated mold can achieve adequate crystallinity (i.e. about 25 percent) but not satisfactory impact strength nor acceptable cycle times. The required heat treatment is also too long (i.e. 30 to 60 seconds depending upon the temperature) to attain the desired crystallinity and the article is often difficult to remove from the heated mold. These are not new problems, and the industry has come a long way in overcoming the limitations. It is known to add polyolefins and inorganic nucleating agents, or to add only polyolefins, such as polyethylene or polypropylene, to get good results. There is, however, a never ending quest for yet better processing and product properties; to make things faster and faster, and in different ways. So, there is continuing need to decrease crystallization time and increase efficiency, and to be able to achieve fast crystallization on heating from a solid sheet or in cooling from a newly extruded melted sheet. We have discovered a very good way to do that.

SUMMARY

This invention is a composition, and a kit to provide a composition, to provide rapid crystallization on heating and cooling and which has other desirable properties required for use in thermoforming articles useful in high temperature service such as ovenable food trays. In one aspect the invention is a composition for making crystalline polyester sheet and thermoformed articles having a total crystallinity of about 10 to 40 percent, comprising: (a) from 99 to 80 weight percent of a polyethylene terephthalate having an intrinsic viscosity from about 0.65 to about 1.2; (b) from 0.01 to about 10 weight percent of a component having a Nucleation Index on heating and on cooling of at least 110 and optionally, a component (c) comprising from about 0.1 to about 10 weight percent of a polyolefin with repeat units derived from monomers containing 2 to 6 carbon atoms; where Nucleation Index (NI) is determined according to the equation, $NI$: Heating = $(Xc)$ (Slope)/(Peak) (Range)

$NI$: Cooling = $(Xc)$ (Slope) (Peak)/(Range);

where:
  $Xc$ is the degree of crystallinity,
  Slope is the steepness of crystallization exotherm onset,
  Peak is the peak crystallization exotherm temperature, and
  Range is the temperature range of the crystallization exotherm.

In another aspect the invention is a kit for making a polyester composition to make thermoformed articles having a total crystallinity of about 10 to 40 percent. The kit comprises two components; (a) a component of predetermined weight comprising a major amount of polyethylene terephthalate having an intrinsic viscosity from about 0.65 to 1.2; and (b) a component comprising a composition having a Nucleation Index on heating and on cooling of at least 110 (as defined above) in an amount that when added to (a) provides a concentration of from about 0.01 to about 10 weight percent based on total weight. Optionally, component (b) also contains a polyolefin with repeat units derived from monomers containing 2 to 6 carbon atoms sufficient to provide from about 0.1 to about 10 weight percent based on total weight.

In another aspect the invention is a thermoformed, non-oriented, heat set, thin walled article, the composition of which comprises;(a) from 99 to 80 percent of a polyethylene terephthalate having an intrinsic viscosity from about 0.65 to about 1.2; (b) from 0.01 to about 10 weight percent of a composition having a Nucleation Index on heating and on cooling of at least 110 (as defined above) and optionally, (c) from about 0.1 to about 10 weight percent of a polyolefin with repeat units derived from monomers containing 2 to 6 carbon atoms.

DETAILED DESCRIPTION

This invention is a polyester composition suitable for, and a process for, sheet that rapidly crystallizes when thermoformed and, in another embodiment, articles made from such sheet, comprising polyethylene terephthalate and a nucleating agent which has excellent nucleating properties both on heating and on cooling through its softening point. Optionally, the composition also contains a heat stabilizer. Other aspects of this invention include sheet and formed articles made from the composition described above.

Polyethylene terephthalate (PET) has very desirable high temperature dimensional stability, chemical, oil, and solvent resistance and the ability to pass microwave radiation without absorbing or reflecting it. These properties make it excellent for use in food containers used in high temperature service.

Polyethylene terephthalate polymer is made by known polymerization techniques from terephthalic acid or its lower alkyl ester (dimethyl terephthalate) and ethylene glycol. Terephthalic acid or dimethyl terephthalate is either esterified or transesterified and then polycondensed with ethylene glycol to a high molecular weight. The PET of this invention is comprised of repeat units derived from the terephthalic acid or dimethyl terephthalate and ethylene glycol. It may be modified to contain a small amount of repeat units derived from diacids other than terephthalic acid and/or glycols other than ethylene glycol. For example, small amounts of isophthalic acid or a naphthalene dicarboxylic acid (or the corresponding diesters) can be used. Also, diols containing from 3 to 8 carbon atoms, such as 1,4-butane diol, can be used as part of the glycol component content. Normally, no more than about five (5) weight percent of the repeat units should be other than terephthalic acid (or dimethyl terephthalate) and ethylene glycol.

For our invention the PET (or modified PET) has an intrinsic viscosity (I.V.) of a least about 0.6 dl/g, and in most cases an I.V. of between 0.65 to about 1.2 dl/g. Intrinsic viscosity, a measure of molecular weight, is defined as the limit of the fraction in v/C as C, the concentration of the polymer solution, approaches 0, in which v is the inherent viscosity that is measured at several different concentrations in a 60/40 mixed solvent system of phenol and tetrachloroethane at 30° C.

An essential component of this invention is a compound or composition that acts to nucleate rapid crystallization of the PET both when heated from a low temperature and when cooled from its molten state. In addition, the nucleating component must not significantly reduce impact strength of the composition. It has been found that fluorocarbon polymers and fluorinated copolymers work very well for this purpose. Polytetrafluoroethylene (commonly known as PTFE). Teflon ™, a product of E. I. du Pont de Nemours & Co. is suitable and meets the requirements for thermoformed articles described above. Other manufactures of polytetrafluoroethylene include Daikin Kogyo (Polyflon), Hoechst (Hostaflon), ICI (Fluon) and Ausimont (Algoflon and Halon). Powder form of polytetrafluoroethylene (e.g. less than 10 micron particles) is convenient for use in the composition of this invention. We have devised a classification system to determine suitable nucleating agents. This system is based on the "Nucleation Index" of the nucleating compound or composition. The Index is based on the aggressiveness of nucleation/crystallization during either heating or cooling from the molten state. It is obtained by multiplying the "good" parameters, and dividing by the "bad" parameters, in each (heating or cooling) mode. For the heating mode, high percent crystallinity and exotherm slope are considered "good", whereas high peak temperature and wide crystallization range were considered "bad". In the cooling mode, high peak temperature is considered "good", indicating earlier onset of crystallization, whereas the other parameters are the same as for the heating mode. Thus, in the heating mode, the Nucleation Index, $NI_H$, is shown by the following equation:

$$NI_H = (Xc)(Slope)/(Peak)(Range)$$

and in the cooling mode $$NIc = (Xc)(Slope)(Peak)/(Range)$$

where:
Xc: degree of crystallinity of the PET
Slope: steepness of crystallization exotherm onset
Peak: peak crystallization temperature
Range: temperature range of crystallization exotherm A nucleating composition comprised of a linear low density polyethylene (such as a product of Exxon Chemical Co., trade named ESCORENE LL 1001.59) and a heat stabilizer is used as the base point and assigned a NI value of 100 for both the heating and cooling mode. The base nucleating agent is included at 3 percent by weight of the PET component and the heat stabilizer is Ethanox 330 (an antioxidant made by Ethyl Corporation) in an amount of 0.015 percent. This nucleating agent is described in detail in U.S. Pat. No. 4,572,852.

To determine the Nucleation Index approximately 10 mg of sheet (of approximately 30 mil thickness) of polyester to be evaluated is crimped into an aluminum pan from a Mettler TA3000 series calorimeter equipped with a DSC 30 cell (or equivalent) and placed in the Different Scanning Calorimeter (DSC) furnace in a nitrogen blanketed atmosphere. The DSC is programmed to heat from 35° C. to 300° C. at 10° C. per minute, and to hold the sample at 300° C. for 2 minutes, then cool back to 35° C. at the same rate.

Crystallization exotherms are evaluated for position on the temperature axis, peak temperature, and slope (angle) of the onset side. Included areas under both exotherms and endotherms are determined by use of a DSC TC10A computer or equivalent. Percent crystallinity is calculated using 140 Joules/gm as the heat of fusion for a pure PET crystal.

Any nucleating compound or composition having a $NI_H$ and a NIc above 110 and that does not reduce impact strength measured at $-20°$ F. below about 300 grams is suitable for the composition and other embodiments of this invention. Impact strength is measured by the ASTM 1709 modified falling dart method.

In addition to the nucleating agent the composition may also contain a polyolefin produced from monomers having from 2 to 6 carbon atoms. Such monomers include low density polyethylene, high density polyethylene, linear low density polyethylene, polypropylene, polyisopropylene, polybutylene, polypentene and polymethylpentene. The polyolefin is used in an amount of up to about 10 percent by weight and preferably about 1 to 5 percent by weight. Preferred polyolefins are linear low density polyethylenes such as that made by Exxon Chemical Co. as trade named product ESCORENE LL 41001.59. Since it is desirable that the polyolefin be completely mixed with the polyester, it may be added during sheet extrusion where it is homogeneously mixed with the PET. It is also possible to mix the polyolefin by other mechanical means, but extruder mixing is especially preferable when using separated packages of polyester and additives as described below.

The composition of this invention will optionally contain one or more heat stabilizers. A heat stabilizer is especially desirable for use in an article for high temperature service, as, for example, an ovenable food container. An effective heat stabilizer will provide protection to the composition at temperatures associated with product use (e.g. 200° C.) and the forming processes to which the composition may be subjected. Useful heat stabilizers are antioxidant compounds.

Representative heat stabilizers include alkylated substituted phenols, bisphenols, thioacrylates, aromatic amines, organic phosphites, and polyphosphites. Particular aromatic amines include primary polyamines, diaryl amines, bisdiarylamines, alkylated diarylamines, ketone diarylamine condensation products, aldehyde-amine condensation products and aldehyde imines. Suitable polyphenols include, tetrakis(methylene-3(3,5-di-t-butyl-4-hydroxyphenyl) propionate)methane and 1,3,5-trimethyl-2,4,6-tris(3,5-di-t-butylybenzyl) benzene. Ethanox 330 TM (a trademarked product of Ethyl Corporation) is a preferred commercial stabilizer.

An effective amount of stabilizer is generally within the range of about 0.005 to about 2 percent by weight based on the total weight of polyester composition, and usually between about 0.01 to 0.5 percent. The amount will be determined by the stabilization needed, the severity of the application, and solubility and effectiveness.

Pigments and colorants, preferably non-nucleating compounds, can also be added to the composition. For example, titanium dioxide can be used to produce a white product. Other colorants include phthalocyanine blue, solvent red 135, and disperse yellow 64 (CAS No. 10319-14-9).

The compositions are easily made by melt blending PET with the nucleating agent and heat stabilizer, colorant and other additives. Such blending will be made at temperatures above the melting point of PET (260° C. for homopolymer) and generally between about 260° to 315° C. Normally a temperature of between about 280° C. and 300° C. is suitable. In commercial operations, blending is generally carried out in an extruder or extruders that provide sufficient shear to give adequate mixing.

It is often expedient to package the polyester and nucleating agent separately. In this way the polyester is sold for a variety of applications, some requiring nucleating agent and some not. Moreover, separate packaging allows variety in selection of the nucleating agent and other additives (such as heat stabilizer). Thus, the present invention in one aspect is a kit of separate packages of polyester and nucleating additives. It is preferred that the polyester (in pellet or cube form) be packaged without additives. Various size containers ranging from gaylords to railcars are used. Separate packages of additives are prepared to match the size of the polyester package or usage, for example an additive package comprising 0.309 pounds polytetrafluoroethylene nucleating agent would be matched with 100 pounds of polyester to provide a 0.3 percent by weight blend. The optional polyolefin additive may also be added to the nucleant package. Thus, for a desired blend of 3.0 percent polyolefin and 0.3 percent nucleant, a package to match 100 pounds of PET would comprise 3.09 pounds polyolefin and 0.309 pounds polytetrafluoroethylene. It is preferred that the heat stabilizer be blended into the polyolefin before it is mixed with the PET. For example about 0.6 weight percent (based on total blend weight) Ethanox TM 330 (a stabilizer) could be used.

The contents of these packages are mixed on the site of use, or as required. Since it is important that the components be well mixed, it is preferred that they be mixed by melt blending as described above and preferably in an extruder or other high-shear mixer. When used for film and sheet, the components are mechanically blended upon introduction into the film extruder. The melted blend is extruded through an elongated die onto a moving roll or carrier, cooled to quench and otherwise prepared for further use. It is especially convenient to blend the components of the kit in this way. An alternative method involves the preliminary step of masterbatching approximately some portion (e.g. about one quarter by weight) of polyolefin with PET. The film is produced by conventional extrusion or casting methods. As will be appreciated, there are numerous ways in which the kit can be configured.

Another aspect of this invention relates to a process for producing heat set, thin-walled articles from the polyester compositions described above using conventional thermoforming equipment. Thin-walled as used in this context means articles having wall thickness less than 1 millimeter (40 mils). Greater wall thickness can be used if sufficient means are used to uniformly heat the sheet without excess crystallization. The complete technique consists of the following steps:

1. Forming a substantially amorphous sheet from the homogeneously blended PET/nucleant composition.
2. Preheating the sheet until it softens and positioning it over the mold.
3. Drawing the preheated sheet onto the heated mold surface.
4. Heat setting the formed sheet by maintaining it in contact against the heated mold for sufficient time to partially crystallize it.
5. Stripping the part out of the mold cavity.

The sheet is made by extrusion from a flat die and quenched immediately to reduce crystallization. Excess crystallization at this stage makes it difficult to thermoform.

An alternative method, sometimes known as a "melt-to-mold" process involves the steps outlined above except in steps 1 and 2 the extruded sheet (maintained above its glass transition temperature) is passed directly onto the mold surface as in step 3, eliminating the need to reheat. Of course, in this method it is necessary that the polyester blend be capable of rapid crystallization on cooling. In the first outlined process, it is necessary that the polyester blend rapidly crystallize on heating. Our invention is capable of, and especially desirable for, use in either forming process.

The term substantially amorphous as used in this description means a sheet having a level of crystallinity low enough to enable thermoforming with satisfactory mold definition and part formation. In currently available thermoforming processes, the level of crystallinity should not exceed about 10 percent.

Preheating the substantially amorphous sheet prior to positioning it over the thermoforming mold is necessary to achieve the very short molding times required for viable commercial operation. Generally a 5 to 7 second cycle time is acceptable. The sheet must be heated above its glass transition temperature (Tg) and below the point that it sags excessively during positioning over the mold cavity. In the melt-to-mold process the sheet is cooled from its melt temperature to the appropriate temperature. The preferred ranges of temperature is 220° C. to 160° C., and most preferably 220° C. to 170° C.

Any of the known thermoforming methods may be used, including vacuum assist, air assist, mechanical plug assist or matched mold forming. The mold should be preheated to a temperature sufficient to achieve the degree of crystallinity desired. Selection of optimum mold temperature is dependent upon the type of thermoforming equipment, configuration and wall thickness of the formed articles and other factors. The operable range of mold temperatures is 150° C. to 215° C. The preferred range is 160° C. to 190° C.

Heat setting is a term describing the process of thermally inducing partial crystallization of a polyester article without appreciable molecular disorientation. Heat setting is achieved by maintaining intimate contact of the film or sheet with the heated mold surface for a sufficient time. Crystallinities of about 10 to about 40 percent are suitable. For containers used in high temperature food service crystallinity should be above about 15 percent. It is preferred that crystallinity be in the range from 20 to 40 percent for the excellent dimensional stability useful for most applications.

The term glass transition temperature means that temperature or temperature range at which a change in slope appears in the volume versus temperature curve and defines a temperature below which the polymer exhibits a glassy characteristic and above which the polymer exhibits a rubbery characteristic. The glass transition (Tg) of PET in various states has been reported as follows: Amorphous: 67° C.; Crystalline: 81° C.; Oriented and Crystalline: 125° C.

Density is a convenient method of measuring percent crystallinity. A calibrated gradient column is used for determining density at a particular temperature. The density value is converted (from the known relationship of density to crystallinity) to a percent crystallinity.

The terms crystallization temperature and crystallization onset are used interchangeably to mean the temperature or temperature range at which a regularly repeating morphology, brought about by a combination of molecular mobility and secondary bonding forces, is induced in a polymer over a molecular distance of at least several hundred angstroms. The crystallization temperature or crystallization onset can be visually observed as the point at which a substantially amorphous unoriented sheet of PET/polyolefin changes from a translucent, hazy appearance to a white appearance.

ILLUSTRATIVE EMBODIMENT 1

A base polyethylene terephthalate (PET), designated TTF 9506, with an I.V. of 0.95 was used to demonstrate the advantages of this invention. The base polymer was dried in a hopper-dryer for several hours before dry blending with the nucleation additive to be evaluated. Additives were dried in a vacuum oven at various temperatures depending upon their heat stability. The additives and base polymer were blended and extruded using a 2.5 inch diameter Egan extruder. For crystallization behavior determination, approximately 10 mg of sheet was crimped into an aluminum pan of a Mettler TA3000 series calorimeter, equipped with a DSC30 cell, and placed in the DSC furnace in a nitrogen blanketed atmosphere. The DSC was programmed to heat from 35° C. to 300° C. at 10 degrees per minute, hold the sample at 300° C. for 2 minutes, then cool back down to 35° C. at the same rate.

Crystallization exotherms were evaluated for position on the temperature axis, peak temperature, and slope (angle) of the onset side. Included areas under both exotherms and endotherms were determined using a DSC TC10A computer. Percent crystallinity was calculated using 140 Joules/gm as the heat of fusion for a pure PET crystal. [See A. Metha, U. Gaur, and B. Wunderlich, Journal of Polymer Science-Physics, 16, 289 (1978)]

Table I lists the polymers/additives used. Compositions, and amounts added to the base polymer (TTF9506), are shown. NA-1 is a LLDPE (Exxon ESCORENE TM LL1001.59) resin mixed with 0.6 weight percent Ethanox 330. The PTFE used was Polymist F 5A polytetrafluoroethylene obtained from Ausimont, in powdered form (less than 6 micron particles). Moldpro is a proprietary lubricant obtained from Witco Corporation, BaSO4 was in powdered form, as obtained from HYTOX Corporation. A900 is a liquid crystalline polyester in pellet form obtained from Hoechst Celanese. Table II details the crystallization results on heating from ambient to 300° C. Column 1 lists the additives. Column 2 lists the percent crystallinities calculated from the area under the melting endotherms representing total crystallinity of the starting polymer plus that developed during the heating scan. Column 3 shows the slopes of the onset side of the crystallization exotherms; a steeper slope (higher angle) indicating faster crystallization. The temperatures in column 4 were measured at the peak of the crystallization exotherms, and the (temperature) widths of the exotherms are given in the last column. The last entry (row) at the bottom of the table is the base polymer, without added nucleant.

Table III details the crystallization results upon cooling the melt back to ambient temperature. The data columns are analogous to those in Table II, except for TOTAL CRYSTALLINITY, which is the area under the crystallization exotherm. All formulations containing LLDPE (NA-1) showed an additional small exotherm at about 107° C., resulting from crystallization of the LLDPE.

The results from Tables II and III were used to determine the "Nucleation Index" of each additive (see Table IV). This Index is based on the aggressiveness of nucleation/crystallization during either heating or cooling. The Index is obtained by multiplying the "good" parameters, and dividing by the "bad" parameters, in each (heating or cooling) mode. The equations shown below were used. For the heating mode, high percent crystallinity and exotherm slope were considered "good", whereas high peak temperature and wide crystallization range were considered "bad". In the cooling mode, high peak temperature was considered "good", indicating earlier onset of crystallization, whereas the other parameters were as discussed above, for the heating mode.

Thus, in the heating mode $$NI_H = (X_c)(Slope)/(Peak)(Range)$$

and in the cooling mode $$NI_C = (X_c)(Slope)(Peak)/(Range)$$

where:
  $X_c$: degree of crystallinity
  Slope: steepness of crystallization exotherm onset
  Peak: peak crystallization exotherm temperature
  Range: temperature range of crystallization exotherm
For the Nucleation Index (NI), NA-1 is assigned a value of 100.

TABLE I

DESCRIPTION AND CONCENTRATION OF ADDITIVES*

| ADDITIVE | DESCRIPTION | WEIGHT % |
|---|---|---|
| NA-1 (Control) | LLDPE + antioxidant | 3.0 |
| PTFE | Polytetrafluoroethylene | 0.3 |
| PTFE + NA-1 | PTFE/NA-1 | 0.3/3.0 |
| BaSO4 | Barium Sulfate | 0.5 |
| BaSO4 + NA-1 | BaSO4/NA-1 | 0.5/3.0 |
| MOLDPRO | Proprietary lubricant (Witco) | 0.5 |
| MOLDPRO + NA-1 | Lube/NA-1 | 0.5/3.0 |
| A900 | Vectra A900 LCP (Hoechst Celanese) | 0.3 |
| A900 + NA-1 | A900/NA-1 | 0.3/3.0 |

*Base polymer was 0.95 IV PET (TTF9506)

TABLE II

CRYSTALLIZATION RESULTS ON HEATING (Ambient to 300(°C.))

| ADDITIVE | TOTAL CRYSTAL-LINITY %* | SLOPE, degrees | PEAK TEMP (°C.) | TEMP RANGE (°C.) |
|---|---|---|---|---|
| NA-1 (Control) | 26.1 | 84.0 | 130.5 | 116-159 |
| PTFE | 25.8 | 87.0 | 129.5 | 118-158 |
| PTFE + NA-1 | 25.1 | 85.0 | 128.1 | 114-150 |
| BaSO4 | 25.8 | 86.5 | 131.8 | 122-160 |
| BaSO4 + NA-1 | 23.2 | 86.5 | 128.1 | 115-150 |
| MOLDPRO | 27.1 | 86.5 | 129.1 | 112-150 |
| MOLDPRO + NA-1 | 26.5 | 85.5 | 124.7 | 112-160 |
| A900 | 25.7 | 87.0 | 128.7 | 116-158 |
| A900 + NA-1 | 25.4 | 86.0 | 127.4 | 114-159 |
| Control PET | 19.0 | 87.0 | 131.8 | 122-160 |

*Area under the melting endotherm

TABLE III

CRYSTALLIZATION RESULTS ON COOLING (300° C. to Ambient)

| ADDITIVE | TOTAL CRYSTAL-LINITY %* | SLOPE degrees | PEAK TEMP (°C.) | TEMP RANGE (°C.) |
|---|---|---|---|---|
| NA-1 (control) | 24.9 | 81.0 | 181.2 | 217-147 |
| PTFE | 28.0 | 88.0 | 207.6 | 220-170 |
| PTFE + NA-1 | 27.9 | 88.0 | 204.9 | 217-160 |
| BaSO4 | 27.7 | 87.0 | 202.5 | 217-157 |
| BaSO4 + NA-1 | 26.7 | 87.5 | 207.5 | 220-180 |
| MOLDPRO | 30.2 | 84.0 | 189.4 | 220-149 |
| MOLDPRO + NA-1 | 28.9 | 85.0 | 190.3 | 220-150 |
| A900 | 29.6 | 87.5 | 201.5 | 217-163 |
| A900 + NA-1 | 28.3 | 87.0 | 194.7 | 217-150 |
| (TTF9506) | 27.6 | 84.0 | 184.7 | 220-147 |

*Area under the crystallization exotherm

TABLE IV

NUCLEATION INDEX* (CONTROL = 100)

| HEATING | | COOLING | |
|---|---|---|---|
| ADDITIVE | NI$_H$ | ADDITIVE | NI$_C$ |
| MOLDPRO | 122 | BaSO4 + NA-1 | 232 |
| PTFE + NA-1 | 118 | PTFE | 196 |
| BaSO4 | 114 | A900 | 185 |
| BaSO4 + NA-1 | 113 | PTFE + NA-1 | 169 |
| PTFE | 111 | BaSO4 | 156 |
| A900 | 106 | A900 + NA-1 | 137 |
| NA-1 | 100 | MOLDPRO | 130 |
| A900 + NA-1 | 98 | MOLDPRO + NA-1 | 128 |
| MOLDPRO + NA-1 | 97 | TTF9506 | 112 |
| TTF9506 | 84 | NA-1 | 100 |

ILLUSTRATIVE EMBODIMENT 2

Trays were made by extrusion of sheet in a laboratory extruder, by dry blending dried additive with dried PET as in Illustrative Embodiment 1. The trays and sheet have the properties shown in Table V.

TABLE V

Tray Properties

| Sample Additive | I.V. dl/g | Impact, grams @ −20° F. | Tray Spec. grav. | Preheat time, sec. | Release time, sec. | Sheet temp °F. |
|---|---|---|---|---|---|---|
| 3.0% NA-1 | 0.896 | 396 | 1.360 | 15 | 9-10 | 310 |
| 3.0% NA-1 + 0.3% A900 | 0.884 | 322 | 1.359 | 13 | 6-7 | 300 |
| 0.3% A900 | 0.865 | 300 | 1.380 | 17 | 6 | 315 |
| 3.0% NA-1 + 0.3% PTFE | 0.863 | 491 | 1.361 | 14 | 5 | 300 |
| 0.3% PTFE | 0.865 | 322 | 1.377 | 14 | 6 | 300 |
| 3.% NA-1 + 0.5% Moldpro | 0.834 | 266 | 1.394 | 12 | 6 | 300 |
| 0.5% Moldpro | 0.819 | 209 | 1.376 | 14 | 7 | 320 |
| 3.% NA-1 + 0.5% BaSO4 | 0.874 | 291 | 1.360 | 14 | 5-6 | 295 |
| 0.5% BaSO4 | 0.878 | 303 | 1.377 | 15 | 12 | 305 |
| No Additives | 0.878 | 263 | 1.374 | 15-16 | 13 | 315 |

Impact was measured by ASTM 1709 modified dart method; Spec. gr. by Mettler S. G. meter. Preheat time is the time required to heat the sheet to optimum forming temperature and Release time is the mold residence time.

As shown in Table V, A900, A900 with NA-1, PTFE, PTFE with NA-1, Moldpro, Moldpro with NA-1 and barium sulfate with NA-1 resulted in excellent mold release times and in that regard would make suitable nucleating additive for sheet and film compositions. PTFE, PTFE plus NA-1, A900, A900 plus NA-1 and barium sulfate did not impair the cold temperature impact strength to unacceptable levels (defined as above 300 grams impact at −20° F. (−29° C.). Only PTFE and PTFE plus NA-1 provided acceptable properties in all three categories: NI greater than 110, impact strength greater than 300 grams at −20° F., and mold release time less than 8 seconds.

The representative embodiments are illustrative of the invention which has the full scope defined by the attached claims.

What is claimed is:

1. A composition for making an extruded polyester sheet useful for making thermoformed polyester articles having a total crystallinity of about 10 to 40 weight percent, comprising:
   (a) from 99 to 80 weight percent of a polyethylene terephthalate having an intrinsic viscosity from about 0.65 to about 1.2 dl/g;
   (b) from 0.01 to about 10 weight percent of polytetrafluoroethylene provided in powder form; and
   (c) from about 0.1 weight percent to about 10 weight percent of a liner low density polyethylene containing an effective amount of a heat stabilizer;
wherein the extruded sheet exhibits a Nucleation Index on heating and on cooling of at least 110, wherein the Nucleation Index (NI) on heating and cooling is determined according to the equations:

$$NI \text{ on Heating} = (Xc)(Slope)/(Peak)(Range);$$

$$NI \text{ on Cooling} = (Xc)(Slope)(Peak)/(Range);$$

where $Xc$ is the degree of crystallinity, Slope is the steepness of crystallinity, Peak is the peak crystallization exotherm temperature, and Range is the temperature range of the crystallization exotherm.

2. The composition of claim 1 in which component (c) contains an effective amount of 1,3,5-trimethyl-2,4,6-tris(3,5-di-tert-butyl-4-hydroxybenzyl)benzene as the stabilizer.

3. The composition of claim 2 in which component (c) is present in the range of 1 to 4 weight percent based on total composition weight.

4. The composition of claim 3 in which the polytetrafluoroethylene powder has a particle size of less than 10 microns.

5. A thermoformed, non-oriented, heat-set, thin-walled article made from the composition of claim 1.

6. A thermoformed, non-oriented, heat-set, thin-walled article made from the composition of claim 2.

7. A thermoformed, non-oriented, heat-set, thin-walled article made from the composition of claim 3.

8. A thermoformed, non-oriented, heat-set, thin-walled article made from the composition of claim 4.

9. The composition of claim 1 in which component (c) contains an effective amount of tetrakis(methylene-3(3,5-di-t-butyl-4-hydroxyphenyl)propionate)methane as the stabilizer.

10. The composition of claim 9 in which component (c) is present in the range of 1 to 4 weight percent based on total composition weight.

11. A thermoformed, non-oriented, heat-set, thin-walled article made from the composition of claim 9.

12. A thermoformed, non-oriented, heat-set, thin-walled article made from the composition of claim 10.

* * * * *